United States Patent [19]

Syme

[11] Patent Number: 4,499,889

[45] Date of Patent: Feb. 19, 1985

[54] METHOD AND APPARATUS FOR IMPROVED CONSTRUCTION OF FUEL BURNING HEATING ASSEMBLIES

[75] Inventor: Duncan C. Syme, Chelsea, Vt.

[73] Assignee: Vermont Castings, Inc., Randolph, Vt.

[21] Appl. No.: 160,548

[22] Filed: Jun. 18, 1980

[51] Int. Cl.³ ............................................. F24C 1/08
[52] U.S. Cl. ..................................... 126/75; 126/76; 126/98
[58] Field of Search ......................... 126/83, 58, 77, 65, 126/110 R, 99 D, 108, 106, 103, 76, 75, 98, 64, 119

[56] References Cited

U.S. PATENT DOCUMENTS

| 664,792 | 3/1900 | Boal | 126/76 |
|---|---|---|---|
| 672,480 | 4/1901 | Hall | 126/99 R |
| 1,688,763 | 10/1928 | Tielkmeyer | 126/103 |
| 2,257,931 | 10/1941 | Alexander | 126/83 |
| 2,475,120 | 7/1949 | Young | 126/83 |
| 2,746,406 | 5/1956 | Karvala | 126/83 |
| 4,177,791 | 12/1979 | Marchant | 126/77 |
| 4,221,207 | 9/1980 | Syme | 126/83 |
| 4,279,237 | 7/1981 | de Pencier | 126/83 |

FOREIGN PATENT DOCUMENTS

| 1058465 | 7/1979 | Canada | 126/62 |
|---|---|---|---|
| 334662 | 7/1929 | United Kingdom . | |
| 669768 | 5/1949 | United Kingdom . | |
| 669375 | 8/1949 | United Kingdom . | |
| 1383956 | 3/1972 | United Kingdom . | |
| 1465401 | 1/1974 | United Kingdom . | |
| 1466111 | 1/1974 | United Kingdom . | |

Primary Examiner—Larry Jones
Assistant Examiner—G. Anderson
Attorney, Agent, or Firm—Kenway & Jenney

[57] ABSTRACT

An improved heating apparatus, for example for use as a wood or coal burning parlor stove and providing a significant heat output, has a construction for reducing thermally induced mechanical stress and for enabling the interior baffle assembly components of the apparatus to be removed therefrom, for replacement if necessary, without dismantling the apparatus exterior frame. The elements of the interior baffle assembly are interconnecting and are secured in a mechanically stable configuration by single point connection to the apparatus frame. The apparatus can have primary and secondary combustion chambers and a baffle system for directing flue gases along a circuitous path from the secondary combustion chamber to an exit aperture whereby a significant proportion of the heat of said gases is given up to the apparatus. A vertically oriented downwardly directed two component baffle separates the combustion chambers. A vertically directed, two component fireback separates the primary combustion chamber from the circuitous path. First and second air paths supply air to the primary and secondary combustion chambers respectively. The air provided by the supply conduits to the respective combustion chambers is preheated and the air provided through the second path promotes secondary combustion of the flue gases to thereby increase the overall efficiency of the stove.

17 Claims, 13 Drawing Figures

METHOD AND APPARATUS FOR IMPROVED CONSTRUCTION OF FUEL BURNING HEATING ASSEMBLIES

BACKGROUND OF THE INVENTION

The invention relates generally to heating apparatus and in particular to wood or coal burning heating apparatus having a high heat conversion efficiency.

Wood-burning stoves have been available for centuries. Perhaps the most well-known early wood-burning stove is the Franklin stove which, while being practical for its time, burned wood inefficiently. That stove, like most cast iron stoves available prior to about 1976, provides for updraft combustion, such as is found in a fireplace and in which the volatile gases (volatiles), which are driven off as the wood burns, are generally left unburned. The unburned volatiles remain for two reasons, first because the gases, by the time they have left the wood, are generally too cool for secondary combustion and second, because oxygen that is admitted to the stove or fireplace is usually consumed by the coals at the base of the fire mass, causing the gases to rise through an oxygen-deficient atmosphere. The loss of the hot, unburned volatile gases is a serious problem, becuase they represent approximately half of the total heat value of the wood. It is as though one were to run an open line of natural gas up a chimney without bothering to ignite it first. In addition, the volatile gases given off from the wood without being ignited may condense on the cool sides of long metal flue pipes and drip out as creosote which may sometimes be inadvertently and dangerously burned, in their solid creosote form, as a chimney fire.

One effective method and apparatus for reducing the volatiles is found in a horizontal combustion heating apparatus wherein the flames move horizontally in the primary combustion zone. This is radically different from typical updraft combustion and is the basis of the more efficient operation of a stove manufactured by Vermont Castings, Inc., the assignee of this invention, a stove which has been sold since at least the first quarter of 1976 under the trade name "DEFIANT". The DEFIANT parlor stove aids the burning of the volatile gases in several ways. First, by using horizontal combustion, the gases are forced to pass close to the hot coals which maintain sufficiently high temperatures to ignite them. In addition, a manually controlled secondary air source, which is segregated from the primary air source, provides air which is ducted down a tube integral with the heated fireback of the primary combustion chamber, which is heated by the hottest part of the fire on two sides, and this channel preheats the air to maintain the air at the elevated temperatures required for combustion. Thus, oxygen from the secondary source is led into the secondary combustion chamber through numerous air ports to mix with the combustible gases and to provide secondary combustion. In the "DEFIANT", the secondary source of air is provided in the secondary combustion chamber along an outside wall of the chamber, away from the primary combustion chamber.

In addition, behind the fireback which is provided at the back of the primary combustion chamber, a circuitous path is provided by smoke baffles or guide plates. The circuitous path generally has a plurality or smoke passages, which conduct the smoke through the passages, back and forth along the back of the apparatus and upwardly toward the exit at the flue collar. Since the heat of the flue gases is considerable, significant heat transfer occurs from the flue gases to the outside surfaces of the stove, which in turn is given off into the room rather than being lost up the chimney. In addition, the circuitous path aids in maintaining a higher temperature in the primary combustion chamber which in turn aids in burning the volatile gases driven off from the wood. Thus, in the "DEFIANT", a large heat output is available. Further, in the "DEFIANT", the fire is controlled by not only the structure of the apparatus but by a thermostatically controlled input port through which the primary air is supplied.

In the "DEFIANT", as in many cast stoves, some of the components defining and enclosing the primary combustion chamber are subjected to significant high temperatures. In particular, in the "DEFIANT", the large cast iron fireback is, at its lower portion, exposed to the primary fire (the combustion region); however, the upper portion of the fireback, being spaced further away from the fire, is not as hot. The resulting different thermal expansions subject the fireback to large, thermally induced, mechanical stresses.

In addition, other components of the stove are subject to mechanical and thermal stress due to the high temperatures found in the stove and hence, in time, may fatigue or otherwise wear. In the "DEFIANT", as in other cast iron heating apparatus, the construction is one whereby, once the apparatus is completely secured in an assembled condition, the internal component parts are not removable from the stove without completely disassembling the apparatus, including its outside frame. Thus, if one interior part fails, for whatever reason, the stove must ordinarily be completely disassembled to replace the failed mechanical part. This is typically a mechanical operation which should be performed only at an adequately equipped service facility, for example, the original manufacturing facility. This procedure is both expensive for the manufacturer if he warrants the product or for the customer if the product is not warranted. In addition, there may be a significant period of time during which the consumer is without the stove. If the failure occurs during the winter months, it would likely pose a significant problem for the consumer.

It is therefore a principal object of the invention to provide a heating apparatus in which thermally induced material stresses are significantly reduced and in which interior components can be replaced simply and easily. Other objects of the invention are to significantly reduce any tendency for mechanical failure of the fireback due to thermally induced stresses, to provide an interior component construction for the heating apparatus wherein the interior components can be removed by the consumer, and to provide a heating apparatus which is reliable and which has a long expected operating life.

SUMMARY OF THE INVENTION

The invention relates to a fuel burning heating apparatus having a heat conducting frame and a baffle assembly. The frame encloses the baffle assembly, and the baffle assembly in combination with the frame define a primary combustion chamber, a secondary combustion chamber in gaseous communication with the primary combustion chamber, an opening at a bottom portion of the apparatus connecting the primary and secondary combustion chambers for gaseous communication therebetween, and a flue gas exit path from the secondary combustion chamber to an exit aperture in the frame. The invention in one aspect features a baffle assembly having at least one vertically oriented fireback assembly exposed to the primary chamber from a combustion region of the chamber to a region of the chamber spaced from the combustion region. The fireback assembly features at least two elements, a first of the elements being adjacent to the combustion region and the second of the elements being spaced from the combustion region. The elements are in substantially sealing relationship within each other along adjacent touching surfaces and have a mechanical interrelationship which allows one of the elements to expand as a result of thermal heating independently of any expansion of the other element. The apparatus exit aperture is at a top portion of the frame, in gasous communication with the flue gas exit path, for providing an exit port for combustion products.

In another aspect, the apparatus relates to a fuel burning heating apparatus having a heat conducting frame and a baffle assembly having plurality of interconnecting elements. The frame encloses the baffle assembly, and the baffle assembly in combination with the frame define a primary combustion chamber, a secondary combustion chamber in gaseous communication with the primary combustion chamber, and a flue gas exit path from the secondary combustion chamber to an exit aperture. The invention features a single connection baffle assembly securing element for stably fixing the baffle assembly in position within the frame, and an assembly wherein each of the components of the baffle assembly has a dimensional size which enables each element to be removed from the apparatus through an opening in the frame without disassembly of the frame.

In another aspect of the invention, there is featured a method for assembling a heating apparatus. The heating apparatus has a heat conducting frame enclosing a baffle assembly which, in combination with the frame, defines a primary combustion chamber, a secondary combustion chamber, and a flue gas exit path. The secondary combustion chamber is in gaseous communication with the primary combustion chamber and the flue gas exit path extends from the secondary combustion chamber to an exit aperture in the frame. The method features the steps of assembling at least the bottom and side panel members of the frame; inserting a lower fireback member into the assembly frame in a position supported by the bottom of the frame; introducing an upper fireback member into the assembled frame portion adjacent to the lower fireback member; moving the upper fireback member to a position adjacent a side frame member for interlocking engagement with the lower fireback member; introducing a damper member into the frame and capturing at least the first end of a damper member in the side frame member; introducing an upper panel member into the frame; pivoting the upper panel member about a vertical axis to a pre-operating position adjacent to and in contact with the fireback and at a vertical height below the final operating position; raising the upper panel member substantially to a final position thereby capturing the member against movement in a horizontal direction; introducing a lower panel member into the frame for supporting the upper panel member in its vertical position; and securing the lower panel member into position at a single connection point, whereby the frame and baffle assembly form a stable mechanical structure.

DESCRIPTION OF THE DRAWINGS

Other features, objects, and advantages of the invention will appear from the following description of a preferred embodiment taken together with the drawings, in which.

DESCRIPTION OF A PREFERRED EMBODIMENT

General Description

Figure 1:
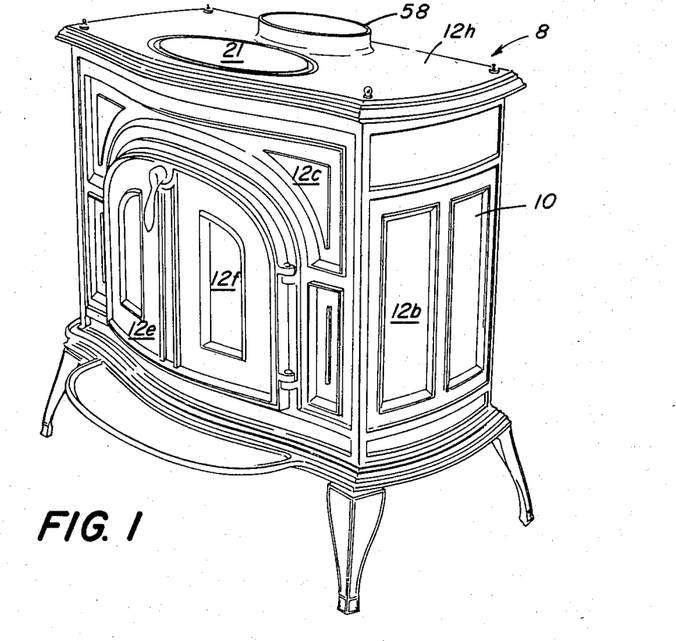
FIG. 1 is a front perspective view of a heating apparatus according to the invention.

Referring to FIG. 1, a wood-burning heating apparatus 8 has an exterior frame member 10 preferably comprised of a heavy-duty cast iron. The sides 12a, 12b, front 12c with doors 12e, 12f, back 12g, top 12h, and bottom 12i of the frame member are joined in a channeled construction to form an integral, airtight unit. The pivoting front doors 12e, 12f, allow the heating apparatus to be opened from the front for both loading of wood and for viewing the fire when the heating apparatus is used as a fireplace. A pivoting side door 14 (FIG. 2) of the apparatus, has hinges 15a, 15b which allow it to pivot about a vertical rotation axis, whereby wood may be loaded into a primary combustion chamber 16 (FIG. 3) from the side of the apparatus. In its closed position, door 14 seals against a gasketing material such as a one-quarter inch diameter asbestos rope sealing member. Door 14 interlocks with a damper 18 (FIGS. 3 and 4) whose position is controlled by a handle 20 (FIG. 2) so that the door can be fully opened only when the apparatus is in an updraft combustion configuration as described in more detail below. Illustrated top member 12h supports a cast iron cooking surface 21.

Figure 2:
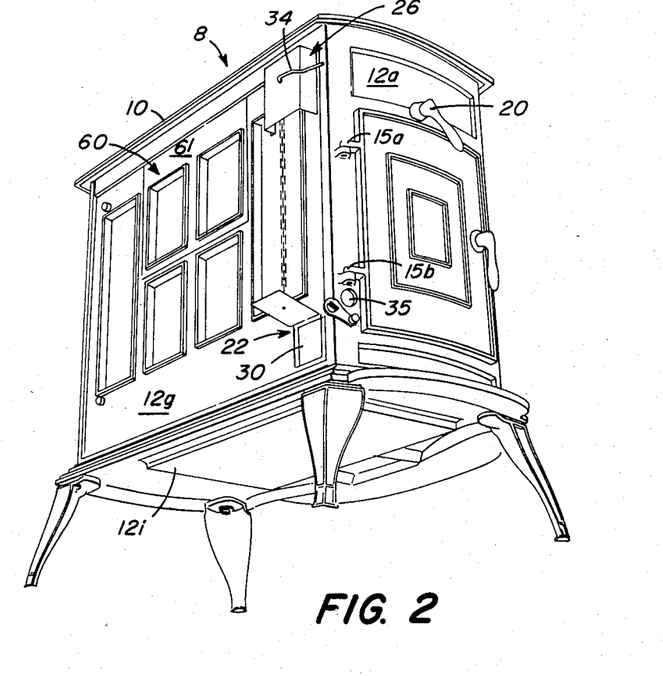
FIG. 2 is a back perspective view of the heating apparatus of FIG. 1.
Figure 3:
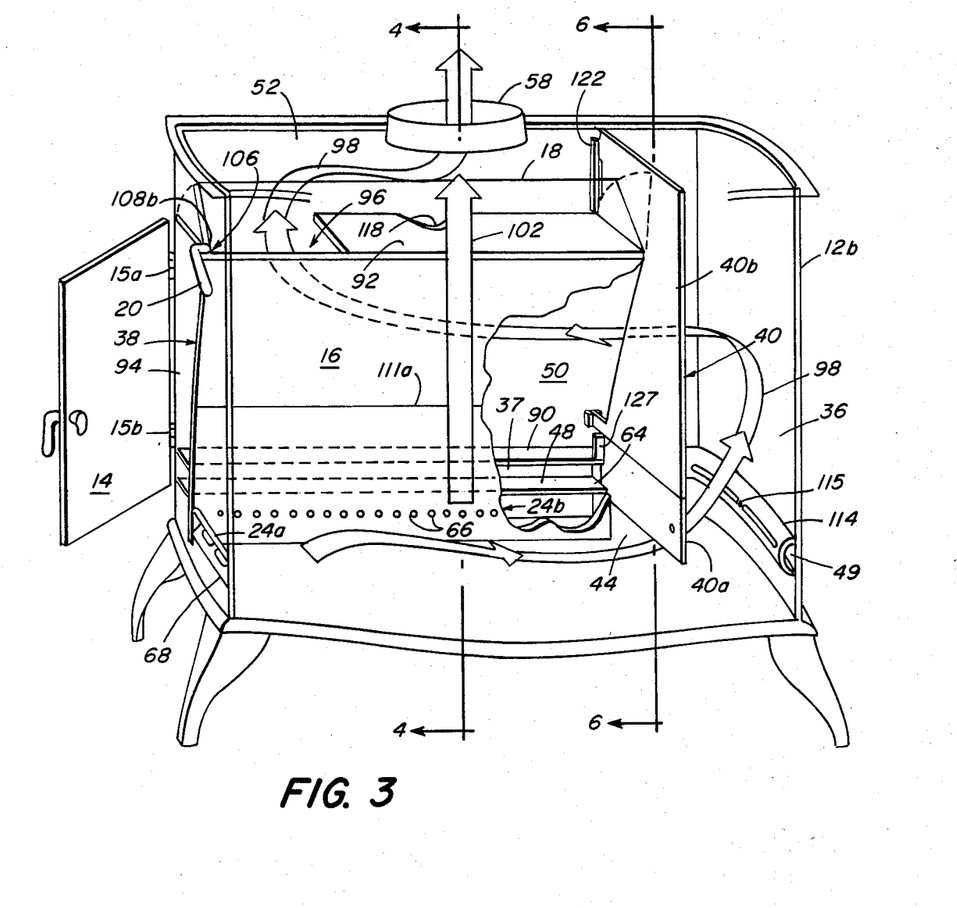
FIG. 3 is a cut-away front perspective view of the heating apparatus according to the invention.
Figure 5:
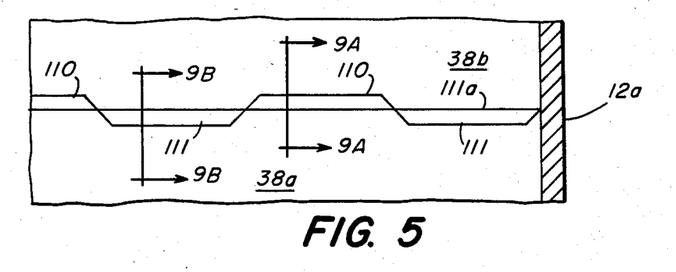
FIG. 5 is a partial rear elevation view of the fireback assembly.

Referring to FIGS. 2 and 3, air is supplied to the primary combustion chamber 16, through a primary inlet port 22, by a primary air supply flow path having branches 24a, 24b (FIGS. 3 and 5). Inlet port 22 is thermostatically controlled by a thermostat 26 which operates a pivoting damper 28, removably covering an aperture 30 in the back frame member 12g. Thermostat 26 is for example an 8" coil of bimetallic material connected to damper 28 by a flexible chain 32. Heating apparatus 8 also has a damper control lever 34 for regulating thermostat 26. A manually controlled night/secondary air inlet port 35 in side member 12a provides the air inlet for air supplied to a secondary combustion chamber 36 (FIG. 3) through a secondary air flow path 37.

Referring to FIG. 3, primary air entering through aperture 30 travels through primary air supply paths 24a, 24b and is heated by contact with the hot walls which define the supply paths 24a, 24b. Thus, the primary air is preheated and therefore helps to keep a hotter fire going with less air and wood being consumed. The primary combustion chamber is bounded by a substantially vertically oriented downwardly extending, fireback baffle 38 (having two component members 38a, 38b, FIG. 4), side door 14 and side wall 12a of the frame member, the front doors 12e, 12f and front wall 12c of the frame member, the top 12h and bottom 12i frame member panels (FIG. 1), and a vertically oriented interior two piece baffle panel 40 (having two component elements 40a, 40b) which separates the primary combustion chamber from the secondary combustion chamber 36.

The secondary combustion chamber is connected to and is in gaseous communication with the primary combustion chamber through an opening 44 defined by lower panel component element 40a, in combination with the frame members, here the bottom and front frame members, and the lower fireback member 38a. The secondary combustion chamber is bounded by the vertically oriented two component panel 40 in combination with frame members 12b, 12c, 12g, 12h, and 12i. As noted above, the secondary combustion chamber receives preheated air from the air inlet port 35 through the secondary air supply flow path 37. The flow path 37 has an imperforate section 48 which extends between the inlet port 35 and panel 40, and a perforate section 49 extending from panel 40 into the secondary combustion chamber.

The Flame Path

Behind the two component fireback baffle 38 are a plurality of connecting smoke passages 50, 52 which provide a circuitous path from the secondary combustion chamber to the flue exit opening at flue collar 58. (This illustrated embodiment has a top exiting flue collar.) These passages direct the spent flue gases from the secondary combustion chamber to the left end of the illustrated apparatus through passage 50, then upward into the upper channel or passage 52 back toward the right-hand portion of the stove, where they exit through the flue collar 58.

The secondary combustion chamber, taken together with the smoke passages, make up the flame path. Since the temperature of the flue gases is very high, and is transferred to the exterior surfaces of the stove as the flue gases traverse the passages, a significant amount of heat is given off to the room, especially through the side and back frame members, rather than being lost up the chimney. In addition, since the passages are adjacent to the primary combustion chamber, higher temperatures are maintained with the fire mass itself, which aids in burning the volatile gaseous products escaping from the burning wood.

The illustrated flue collar 58 is attached to the top panel 12h and provides a vertical or top exit for the spent flue gases. In other embodiments of the invention, the flue collar can be attached, for example, to an upper portion of back panel member 12g to provide a rear exit for the flue gases.

Figure 7:
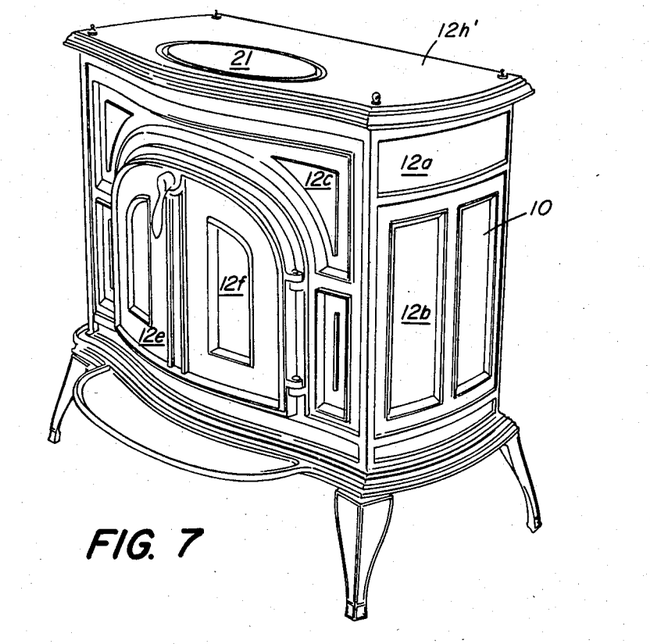
FIG. 7 is a front perspective view of an alternate embodiment of a heating apparatus according to the invention.
Figure 8:
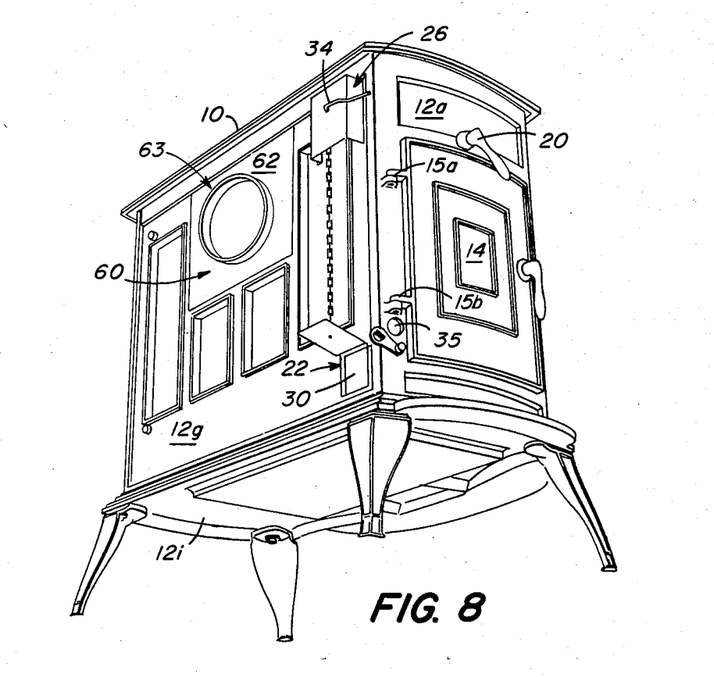
FIG. 8 is a back perspective view of the heating apparatus of FIG. 7.

In the illustrated preferred embodiment of the invention, the back panel 12g has an upper central aperture area 60 in which is placed, as shown in FIG. 2, a panel insert 61. The panel insert 61, for the embodiment illustrated in FIGS. 1-6, seals the back panel and provides an aid in directing the flue gases through the upwardly directed flue collar as shown in FIG. 1. When a rear exiting flue collar is required, however, the insert 61 is replaced by a second insert 62 (FIGS. 7 and 8). Insert 62 has a rearward exiting flue collar 63 as a part thereof. In addition, the top member 12h (FIG. 1) is replaced by a new top member 12h' wherein the original flue collar 58 is replaced by a continuation of the flat top surface of the top panel 12h'. Thus, by providing the insert aperture area 60 in the back panel 12g the same back panel can be employed irrespective of the need for a top or rear exiting flue collar.

The Primary Air Flow Path

As noted above, the thermostatically controlled inlet port 22 supplies air for the primary air flow path. Ambient air enters the apparatus through aperture 30 in frame back wall 12g and almost immediately divides between the side branch 24a and the back branch 24b. That portion of the incoming air which passes into the back branch 24b is directed along the back of fireback baffle 38 and is constrained to follow a path adjacent to the fireback baffle by an enclosing member 64. Lower fireback baffle member 38a has a plurality of holes 66 extending therethrough for providing preheated primary air to the back of the primary combustion chamber. Illustrated enclosing member 64 is an integral extension of the lower fireback baffle member 38a and mates with a ridge 67 formed in back wall 12g. Branch 24b has a substantially constant cross-sectional area along its length.

That portion of the ambient air passing through aperture 30 which follows side branch 24a passes through the lower baffle member 38a at a lower section of the baffle member (FIG. 3) and is directed into the primary combustion chamber along a periodically slotted conduit 68 which extends from baffle 38 along side wall 12a (below side door 14) toward front wall 12c. The illustrated slotted conduit has a cross-sectional area which is substantially constant. Primary air is thus provided to promote a uniform flow of combustion supporting oxygen across the entire primary combustion chamber.

The air provided by primary flow branches 24a and 24b thus enters the primary combustion chamber along the bottom back and bottom left-hand boundary surfaces of the chamber (looking from the front), and provides combustion along the entire bottom of the wood supply. Upon reaching the right-hand portion of the primary combustion chamber, the air flow (now containing volatiles) continues through opening 44 into the secondary combustion chamber and exits through the circuitous flow path provided by the back baffle system arrangement extending between two component fireback baffle 38 and rear wall 12g.

Details of the Back Baffle System

Figure 4:
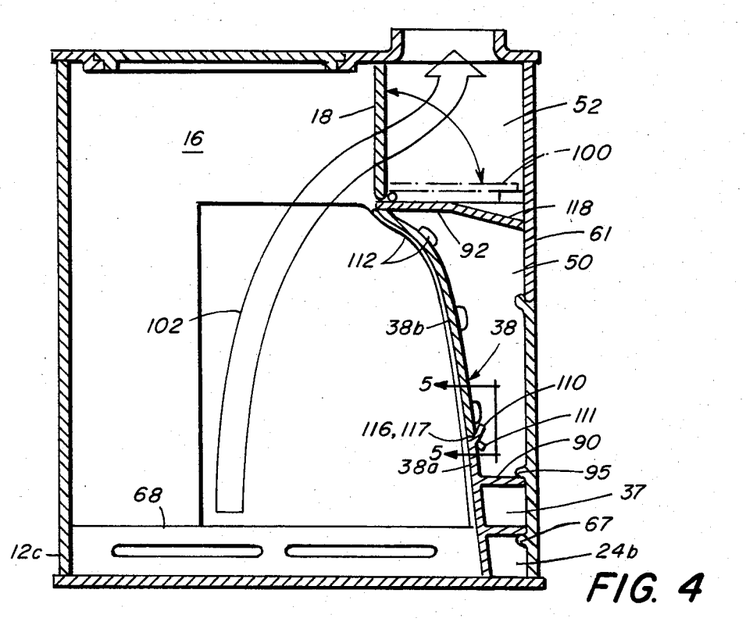
FIG. 4 is a cross-sectional view taken along lines 4—4 of FIG. 3.

Referring to FIGS. 3 and 4, the back baffle system for directing the flue gases along the circuitous path through the space between fireback baffle 38 and back wall 12g consists of a lower guide plate 90, an upper guide plate 92, and a vertical guide portion 94 of side panel 12a. Illustrated lower guide plate 90 is an integral extension of lower fireback member 38a which extends in a transverse direction between the fireback member 38a and mating ridge portion 95 of the back wall of the frame. Illustrated baffle 90 extends lengthwise from the guide portion 94 to the two piece vertical panel 40. Guide portion 94, a part of side wall 12a, is substantially triangularly shaped, substantially matching along one edge the contour of the fireback 38, and extends transversely between the fireback and back wall 12g and vertically from a level near the bottom of door 14 (preferably from lower guide plate 90) to a position above the top of door 14 (and preferably to the level of the upper guide plate 92). Triangular portion 94 provides a barrier to prevent flue gases in the space behind the fireback from escaping through an opened side door.

The upper guide plate 92 (also referred to hereinafter as the smoke shelf) is positioned above and in a substantially parallel plane to guide plate 90 and consists of a cast plate member extending from vertical baffle component 40b to a position near side wall 12a. Plate 92 thereby creates an aperture 96 so that the flue gases pass from the lower horizontally directed passage 50 through aperture 96 to the upper horizontally directed passage 52 from which they exit through the flue collar. Illustrated plate 92 rests on the upper fireback component 38b and protrusions (not shown) extending from back wall 12g.

The Damper

The damper 18 of the heating apparatus enables the apparatus to be used both as a parlor stove and as a fireplace. When the damper is in the substantially vertical position shown in FIG. 4, the heating apparatus operates as a stove and the flue gases exit substantially as shown by the arrow 98 (FIG. 3). When the damper is placed in a substantially horizontal position indicated by dotted lines 100 (FIG. 4), the apparatus can be used as a fireplace with the flue gases exiting from the primary combustion chamber along a path generally indicated by arrow 102. This provides updraft combustion.

When fuel is loaded into the apparatus through side door 14, the flue must be in the closed position (the damper in a horizontal position) or otherwise, smoke will pour out of door opening. An interlocking arrangement between the door 14 and the damper 18 ensures that the flue is closed before the side door 14 can be fully opened. The illustrated arrangement consists of a handle 20 on the damper which is in the vertically downward position and engages door 14 if the door is opened and the flue is not closed. Other arrangements can also be used.

As described in more detail below, the damper 18 is captured for pivoting movement by a first aperture 104 in upper panel baffle element 40b and at a second aperture 106 in side panel 12a into which dowel rod type ends 108a, 108b, respectively, of the damper extend. The handle 20 is secured to the rod member 108b extending beyond the aperture 106 in side panel 12a.

The Removable Structure

As noted above, the baffle assembly including illustrated fireback baffle 38 and vertical panel 40, which in part define the primary combustion chamber, the secondary combustion chamber, and the flue gas flame path, consists of a plurality of members. This construction, in combination with the other interior components (described in more detail below), and cooperating structure on the front, back, and side panels results in an apparatus which has an interior component construction wherein the entire interior baffle assembly of the apparatus is removable through existing front and side doors without disassembling the frame member of the apparatus.

Importantly, and as a separate feature of the invention, the multiple component structure of the fireback by itself advantageously relieves the thermally induced stresses which can be produced in the fireback baffle as a result of the differential temperature profile which exists from the top to the bottom of the fireback. Thus, if the fireback is constructed as a single casting (which is typical of earlier structures), the lower portion of the fireback, that portion closest to the horizontally directed combustion region, is subjected to very high temperatures while the upper portion of the baffle is subjected to lower temperatures. Then, as a result of the naturally occurring thermal expansion in the fireback due to the temperature distribution to which it is subjected, the lower fireback portion tends to expand more, that is grow to a greater extent, than the upper fireback region. Thereby, thermally induced mechanical stresses, tending to cause the fireback to fracture, are generated. By employing the illustrated multiple member fireback, a fireback construction is provided whereby the lower fireback member can expand according to the higher temperatures to which it is exposed while the upper fireback member can independently expand (to a smaller extent) according to the lower temperatures to which it is exposed. Thus, the "break" or split between the illustrated upper and lower fireback portions 38a, 38b, respectively, significantly reduces the thermally induced mechanical stresses which are generated by the temperature differential across the fireback. In other embodiments, the fireback can be split into more than two components.

In the illustrated embodiment, the fireback elements 38a, 38b, are interconnected by a simple mechanical structure, described below. In other embodiments other mechanical interconnections can be employed. According to the illustrated embodiment, the mechanical interconnection consists of providing rearwardly upwardly extending tab portions 110 on the lower fireback and rearwardly downwardly extending tab portions 111 on the upper fireback. These extending portions are located so that they alternate (FIG. 5) so that the upper baffle member can be positioned above the lower baffle member in a non-interferring relationship and can thereafter be lowered at a 45° incline (toward side 12a) to a final position adjacent side panel member 12a. Thereby, the fireback members 38a, 38b mechanically interlock in a self-supporting relationship. This construction provides a substantially sealing relationship between the fireback members along the meeting plane 111a while, in addition, providing the simple mechanical relationship whereby the fireback members are self-supporting.

Figure 10:
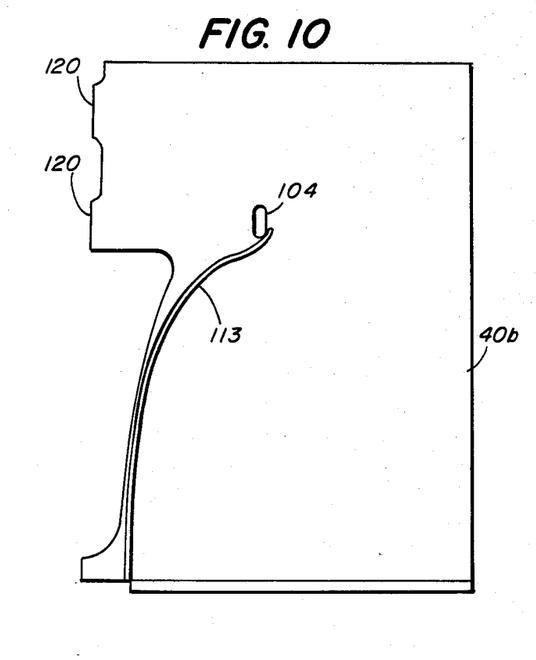
FIG. 10 is a plan view of the upper panel element of the preferred embodiment.
Figure 11:
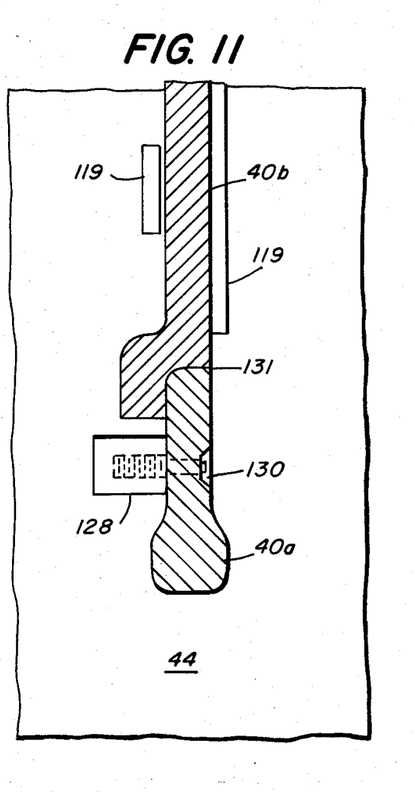
FIG. 11 is a cross-sectional view taken along lines 11—11 of FIG. 6.

The fireback is also supported in part by a cooperating partial channel 112 on the interior of side member 12a and a cooperating curvelinear ridge 113 (FIGS. 6 and 10) extending from the adjacent side of upper vertical baffle element 40b. It is to mate with channel 112 that upper fireback 38b must be lowered, at an angle, into its final position.

Assembly of the Heating Apparatus

The heating apparatus, after the frame members including sides 12a, 12b, front 12c with doors 12e, 12f, back 12g, top 12h, and bottom 12i have been joined in its channeled construction to form an integral, air-tight unit, is assembled as follows. The air tube 114 defining the perforate portion 49 of the secondary air path is placed in position adjacent side 12b and is bolted in place by a bolt 115 threaded into a threaded bolt receiving lug (not shown) on the interior of side 12b. Next, the lower fireback member 38a is inserted through the aperture in side 12a and is positioned on the bottom 12i of the heating apparatus, adjacent the back wall 12g. Guide plate 90 and enclosing member 64 (both integral with illustrated lower fireback member 38a) engage the ridges 95 and 67, respectively, extending from the back wall of panel 12g.

The upper fireback member 38b is now brought into the apparatus through the opening in side 12a, and is lifted to an alignment position wherein the mating surfaces 116, 117 of the upper and lower fireback members respectively are slightly spaced apart with rearwardly protruding extending tab portions 110, 111 begin to mutually engage cooperating portions of the now adjacent extension and fireback member. In this position fireback upper member 38b is offset slightly to the right with respect to fireback lower member 38a. The upper fireback member is thereafter moved downward and to the left to a position adjacent side wall 12a whereby it is supported in the partial channel 112 on the interior side of panel 12a and substantially sealingly mates with the lower fireback member. Additional support is provided by the extension tab portions 110, 111 as they interengage to support the fireback structural members.

With the fireback structure complete, the damper is inserted into the apparatus and the damper dowel rod 108b is inserted into cooperating aperture 106 in side 12a. With the damper in its upright vertical position as indicated in FIG. 4, the smoke shelf or upper guide plate 92 is brought into position and is dropped in place. It is supported by the flat protrusions extending inward from the rear panel 12g and by upper fireback 38b. It should be noted that guide plate 92, due to its vertical height at a rear portion thereof, has a curved depression 118 which provides the correct contour to mate with the rear exiting flue collar when insert 63 is employed.

Now, the upper panel element 40b (FIG. 10) is brought into the heating apparatus through the front opening and is moved toward its operating position (substantially as shown in FIG. 3) and is secured in place as follows. The element 40b is first brought into a substantially vertical plane, parallel to its final position (FIG. 3), but at a level slightly below that final position shown in FIG. 3. As the upper plate element 40b is being brought into this pre-operating position, it first contacts a cooperating channel receiving portion 119 of the interior surface of the front panel 12c, and is pivoted around an axis at that cooperating channel 119, in a vertical plane, and at a vertical height somewhat below its eventual final position. As upper panel element 40b pivots (counterclockwise looking from the top) to a position in contact with the baffle 38, tabs 120 (extending from and integral with element 40b) move into position below cooperating capturing channels 122 extending from the rear panel 12g. The upper element 40b, once in contact with fireback baffle 38, is slid upward in its vertical plane so that tabs 120 engage capturing channels 122 to provide a secured relationship in all but the vertical direction. In addition, as the upper panel element 40b is pivoted to a position in contact with fireback 38, the elongated aperture 104 in the panel element 40b cooperates with the damper dowel rod 108a and captures the damper for pivotal movement about the damper axis extending through apertures 104, 106. In addition, as the upper panel element 40b is raised vertically upward, fireback support ridge 113 provides additional stabilizing support for and a substantially sealing relationship with fireback member 38b. Ridge members extending from the frame provide a sealing relationship with panel element 40b at its extreme upper and side peripheries.

Figure 6:
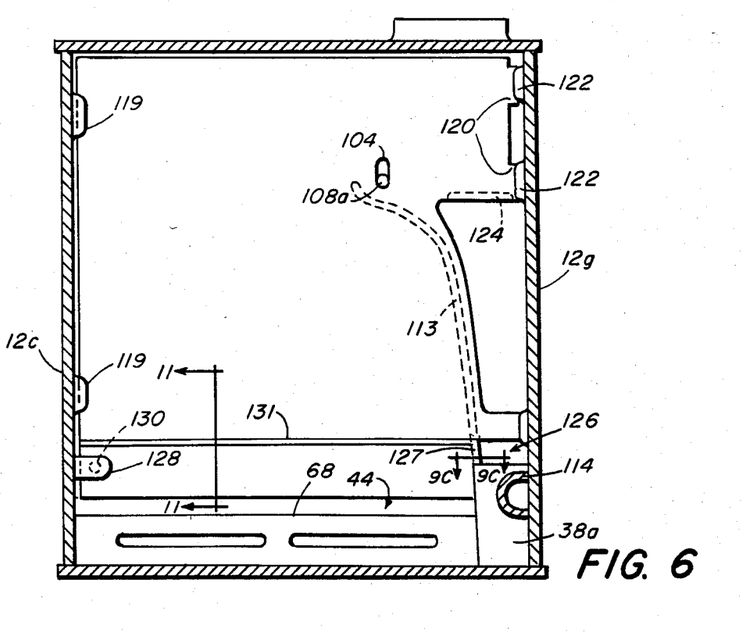
FIG. 6 is a cross-sectional view taken along lines 6—6 of FIG. 3.
Figure 9A:
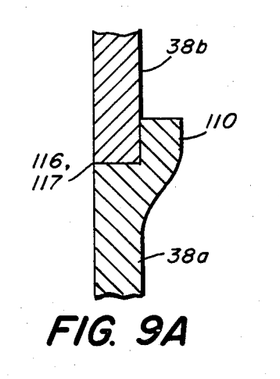
FIGS. 9A and 9B are cross-sectional views of the fireback mating structure taken along lines 9A—9A and 9B—9B respectively of FIG. 5.
Figure 9B:
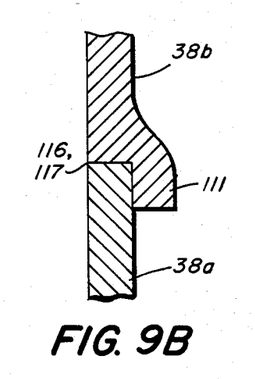
Figure 9C:
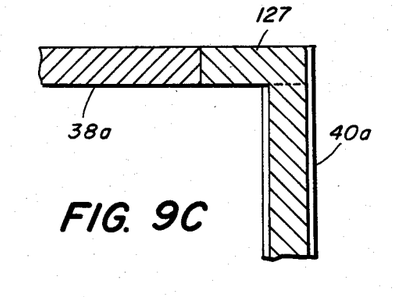
FIG. 9C is a cross-sectional view taken along lines 9C—9C of FIG. 6.

Vertical support for the upper panel element 40b is provided by the lower panel element 40a. The lower panel element is brought into position while the upper plate element 40b is held vertically in its final upward position (FIGS. 3 and 6). With the upper element 40b maintained in its raised upper position, lower panel element 40a is positioned beneath the upper panel element and engages the lower fireback 38a at a pocket portion 126. A right angle tab 127 cooperatively engages a horizontal support surface of lower fireback member 38a and provides the lower panel with a vertical support through the fireback. (See also FIG. 9C.) The lower panel element 40a is thereafter pivoted toward the right hand side of the stove (side 12b), counterclockwise around the pocket connection with the fireback, and engages and bolts to the front frame at a lug 128, a single connection point, using a bolt 130. In this condition, the lower element 40a supports element 40b at their mating surface 131. Lower element 40a is supported vertically at the front panel by a rib (not shown).

The air tube conduit 68 defining primary air path along branch 24a is then bolted into place. The assembly of the heating apparatus is now complete. The removal of the interior components of the heating apparatus according to the invention can be effected by reversing the assembly steps described above. The heating apparatus is thus internally, interactively supported and is substantially held together at a single connection point, lug 128, by the single bolt 130, which maintains all of the baffle assembly and damper components in a stable operating relationship. Furthermore, the connecting bolt is conveniently located for maintenance (for example it can be easily drilled out) should the bolt "freeze" in place due to the high temperatures to which it is exposed. (The air tubes 114 and 68 are, as noted above, conveniently connected by separate bolt members.)

Therefore, if it becomes necessary or desirable to replace any interior element of the heating apparatus, the unit can be easily disassembled, the element replaced, and the unit reassembled with a minimum of effort and without the requirement that the heating apparatus be returned to a well equipped service center which may entail both substantial time delays and expense.

Other embodiments of the invention including additions, subtractions, deletions, and other modifications of the disclosed preferred embodiment, will be obvious to those skilled in the art and are within the scope of the following claims.

What is claimed is:
1. A fuel burning heating apparatus comprising
a heat conducting frame having a door,
a baffle assembly,
said frame enclosing said baffle assembly, and said baffle assembly in combination with said frame defining a front primary combustion chamber further defined in part by said door and accessible therethrough, a rear secondary combustion chamber behind and in gaseous communication with said primary combustion chamber, an opening at a bottom portion of said apparatus connecting said primary and secondary combustion chambers for said gaseous communication therebetween, and a flue gas exit path from said secondary combustion chamber to an exit aperture in said frame, said baffle assembly having at least one vertically oriented fireback assembly exposed to said primary chamber from a combustion region of said chamber to a region of said chamber spaced from said combustion region, said fireback assembly having at least two abutting elements, a first of said elements being adjacent said combustion region and a second of said elements being spaced from said combustion region, said elements being in a substantially sealing relationship with each other along adjacent touching surfaces, and said elements having a mechanical interrelationship which allows said first element to expand, as a result of thermal heating, independently of said second element, tab means for holding said elements together while allowing relative rotation therebetween about the line along which said elements meet, and said exit aperture being at a top portion of said frame and in gaseous communication with said flue gas exit path for providing an exit port for combustion products.

2. The fuel burning heating apparatus of claim 1 wherein said fireback assembly comprises two elements having a substantially vertical orientation and extending from the apparatus bottom to a position near the top of the apparatus, said elements interengaging in a substantially self-supporting condition during operation of the apparatus.

3. A fuel burning heating apparatus comprising
a heat conducting frame having a front loading door,
a baffle assembly having a plurality of interconnecting elements,
said frame enclosing said baffle assembly, and said baffle assembly, in combination with said frame, defining
a primary combustion chamber,
a secondary combustion chamber in gaseous communication with said primary combustion chamber, and
a flue gas exit path from said secondary combustion chamber to an exit aperture,
a single connection baffle assembly securing means for stably fixing said baffle assembly in position within said frame, and
each of said baffle assembly elements has a dimensional size configuration for enabling said element to be removed from said heating apparatus through said front loading door of said frame without disassembly of the frame.

4. The fuel burning apparatus of claim 3 wherein said baffle assembly comprises
a vertically oriented fireback assembly exposed to said primary combustion chamber and having at least two component members, said members sealingly interengaging with each other along at least one horizontally directed meeting line,
whereby said members can independently expand in response to increased operating temperatures.

5. The fuel burning apparatus of claim 4 further comprising
said baffle assembly having a panel assembly for separating said primary combustion chamber and said secondary combustion chamber,
a damper, and
said panel assembly and said frame cooperating to capture said damper for pivotal rotating motion about a damper rotation axis,
whereby in one position of the damper the apparatus operates as an updraft combustion apparatus and in a second position of the damper, as a horizontal combustion apparatus.

6. The fuel burning apparatus of claim 5 wherein said panel assembly has a slotted aperture for engaging and capturing an end of said damper.

7. A fuel burning heating apparatus comprising
a heat conducting frame having at least one opening,
a baffle assembly having a plurality of interconnecting elements,
said frame enclosing said baffle assembly, and said baffle assembly, in combination with said frame, defining
a primry combustion chamber,
a secondary combustion chamber in gaseous communication with said primary combustion chamber, and
a flue gas exit path from said secondary combustion chamber to an exit aperture,
a single connection baffle assembly securing means for stably fixing said baffle assembly in position within said frame,
each of said baffle assembly elements having a dimensional size configuration for enabling said element to be removed from said heating apparatus through said opening of said frame without disassembly of the frame,
a vertically oriented fireback assembly exposed to said primary combustion chamber and having at least two component members, said members sealingly interengaging with each other along at least one horizontally directed meeting line,
said baffle assembly having a panel assembly for separating said primary combustion chamber and said secondary combustion chamber,
a damper,
said panel assembly and said frame cooperating to capture said damper for pivotal rotating motion about a damper rotation axis, and
said frame having a capturing vertical channel means on an interior surface of said frame and a capturing partial channel on an opposing interior surface of said frame,
whereby said at least one element of said panel assembly has tab extensions for cooperating with said partial channels and said one element can be pivoted in a vertical plane about said vertical channel to a position in which said tab extensions can be captured, upon a vertically upward movement, by said partial channel, and
whereby in one position of the damper the apparatus operates as an updraft combustion apparatus and in a second position of the damper, as a horizontal combustion apparatus.

8. The fuel burning apparatus of claim 7 wherein
said panel assembly comprises an upper and a lower panel member,
said upper panel member cooperates with said capturing channel and said partial channel, and
said lower member cooperates with said securing means and supports said upper panel member in its operating position.

9. A fuel burning heating apparatus comprising
a heat conducting frame having a door,
a baffle assembly,
said frame enclosing said baffle assembly, and said baffle assembly, in combination with said frame, defining
a front primary combustion chamber further defined in part by said door and accessible therethrough,
a rear secondary combustion chamber behind and in gaseous communication with said primary combustion chamber,
an opening at a bottom portion of said apparatus connecting said primary and secondary combustion chambers for said gaseous communication therebetween, and
a flue gas exit path from said secondary combustion chamber to an exit aperture in said frame,
said baffle assembly having at least one vertically oriented fireback assembly exposed to said primary chamber from a combustion region of said chamber to a region of said chamber spaced from said combustion region,
said fireback assembly having at least two abutting elements, a first of said elements being adjacent said combustion region and a second of said elements being spaced from said combustion region, said elements being in a substantially sealing relationship with each other along adjacent touching surfaces, and said elements having a mechanical interrelationship which allows said first element to expand, as a result of thermal heating, independently of said second element,
said exit aperture being at a top portion of said frame and in gaseous communication with said flue gas exit path for providing an exit port for combustion products,
said fireback assembly comprising two elements having a substantially vertical orientation and extending from the apparatus bottom to a position near the top of the apparatus,
said elements interengaging in a substantially self-supporting condition during operation of the apparatus,
said two elements being formed with interlocking alternately spaced tabs at the parting line where the two elements meet so that the upper one of said two elements is trapped in captive engagement with the lower one of the two elements.

10. The apparatus of claim 9, wherein the tabs on one of the elements are all rearwardly projecting and the tabs on the other element are all forwardly projecting.

11. An airtight solid fuel burning heating appliance, comprising
a heat conducting enclosure having an air inlet, a flue outlet and a loading door,
removable internal assembly means housed within said enclosure for forming interconnected primary and secondary combustion chambers in operative gaseous communication with said air inlet and said flue outlet,
said internal assembly means consisting essentially of a plurality of interlocking parts all of which are removable through said loading door in a predetermined order, one key part having to be removed first before the other parts can be removed.

12. The appliance of claim 11, wherein said internal assembly means further includes fastening means manually operable from said loading door for releasably securing said key part in place.

13. The appliance of claim 11, wherein among said removable parts said internal assembly means further includes fireback and damper assemblies mounted within said enclosure, said damper assembly being pivotally mounted to allow or prevent gaseous communication between said primary combustion chamber and said flue outlet.

14. The appliance of claim 11, wherein among said removable parts said internal assembly means includes a forward leaning fireback, a side baffle perpendicular to said fireback against which the fireback rests, said side baffle having disengageable means for supporting said fireback and said key part vertically supporting said side baffle.

15. The appliance of claim 14, wherein said fireback comprises two abutting sections disengageably hinged along a line horizontally dividing the fireback,
whereby upon removal of said key part, the side baffle falls free disengaging the fireback to allow the upper section thereof to be tilted outwardly for removal.

16. The appliance of claim 14, wherein among said removable parts said internal assembly means further includes a damper pivotally mounted above the fireback to alternately interconnect the flue exit exclusively with either the primary or secondary combustion chamber, said damper having an axle extending from one end, means on said side baffle for releasably engaging said axle,
whereby, upon removal of said key elements, said side baffle falls free disengaging said damper axle to allow removal of said damper.

17. The appliance of claim 14, wherein said key part supporting said side baffle is apertured to vent the combustion products from the primary combustion chamber into the secondary combustion chamber.

* * * * *